United States Patent [19]

Sakashita et al.

[11] Patent Number: 4,903,005

[45] Date of Patent: Feb. 20, 1990

[54] COMPARATOR CIRCUIT

[75] Inventors: Narumi Sakashita; Yukihiko Shimazu, both of Hyogo, Japan

[73] Assignee: Mitsubishi Denki Kabushiki Kaisha, Japan

[21] Appl. No.: 250,461

[22] Filed: Sep. 28, 1988

[30] Foreign Application Priority Data

Nov. 4, 1987 [JP] Japan .................. 62-278531

[51] Int. Cl.$^4$ .............................. G06F 7/04
[52] U.S. Cl. .................................. 340/146.2
[58] Field of Search ........................ 340/146.2

[56] References Cited

U.S. PATENT DOCUMENTS

| 4,450,432 | 5/1984 | Schmidtpott | 340/146.2 |
| 4,694,274 | 9/1987 | Shimada et al. | 340/146.2 |
| 4,767,949 | 8/1988 | Mayweather, III | 340/146.2 |
| 4,797,650 | 1/1989 | Pickett | 340/146.2 |

FOREIGN PATENT DOCUMENTS 61-211735 9/1986 Japan .

Primary Examiner—David H. Malzahn
Attorney, Agent, or Firm—Townsend & Townsend

[57] ABSTRACT

A multiple digit comparator checks the first and the second input data for a match. If the two input data match, the carry input data from the previous digit is outputted as the carry output data for the next digit; if the two input data do not match, then a no match signal is outputted as the carry output data for the next digit. Next, if the carry input data and the carry output data do not match then a change point signal is outputted. When this change point signal is outputted, the first and the second input data are outputted. This facilitates the design of a more regular comparator circuit layout and of a faster comparator circuit.

5 Claims, 5 Drawing Sheets

FIG. 2

| A | B | XNOR | XOR | OE | OG | OL |
|---|---|------|-----|----|----|-----|
| 0 | 0 | 1 | 0 | IE | Z | Z |
| 0 | 1 | 0 | 1 | 0 | 0 | 1 |
| 1 | 0 | 0 | 1 | 0 | 1 | 0 |
| 1 | 1 | 1 | 0 | IE | Z | Z |

Z : HIGH IMPEDANCE

FIG. 4

| | (1) | | | | (2) | | | | (3) | | | |
|---|---|---|---|---|---|---|---|---|---|---|---|---|
| i | 3 | 2 | 1 | 0 | 3 | 2 | 1 | 0 | 3 | 2 | 1 | 0 |
| Ai | 0 | 1 | 0 | 0 | 0 | 1 | 1 | 0 | 0 | 1 | 0 | 0 |
| Bi | 0 | 1 | 0 | 0 | 0 | 0 | 1 | 0 | 0 | 1 | 1 | 0 |
| OGi | Z | Z | Z | Z | Z | 1 | Z | Z | Z | Z | 0 | Z |
| OLi | Z | Z | Z | Z | Z | 0 | Z | Z | Z | Z | 1 | Z |
| OEi | 1 | 1 | 1 | 1 | 1 | 0 | 0 | 0 | 1 | 1 | 0 | 0 |
| CHANGE POINT SIGNAL 11a | 0 | 0 | 0 | 0 | 0 | 1 | 0 | 0 | 0 | 0 | 1 | 0 |
| | SINCE OE0=1 THEN OG=0 OL=0 | | | | SINCE OE0=0 OG2=1 OL2=0 THEN OG=1 OL=0 | | | | SINCE OE0=0 OG1=0 OL1=1 THEN OG=0 OL=1 | | | |
| | A = B | | | | A > B | | | | A < B | | | |

Z : HIGH IMPEDANCE

COMPARATOR CIRCUIT

BACKGROUND OF THE INVENTION

This invention relates to a binary comparator configured as an integrated circuit and particularly to its capability of achieving higher calculation speeds by arranging given digits in a regular array.

FIGS. 5, 6, and 7 are a circuit diagram of a one digit comparator circuit, and a circuit diagram and a timing chart for a multiple digit comparator circuit, respectively.

FIG. 5 shows a one digit comparator circuit. The explanation below is for a positive logic unless otherwise indicated. A first input data A and a second input data B to be compared are entered in input terminals A and B. The first and second input data A and B are one digit binary numbers. An inverter 102 connected to the second input data B outputs an inverted signal. A NAND circuit 100 is connected to the first input data A and the inverter 102. An inverter 101 is connected to the output of the NAND circuit 100. A NOR ciructi 103 is connected to the input data A and the output of the inverter 102. A NOR circuit 104 has its input connected to the output of the NOR circuit 103 and the output of the inverter 101. A transfer gate 105 has its gate connected the output of inverter 101, its source connected to the power supply, and its drain connected to a carry output terminal CO. A transfer gate 106 has its gate connected to the output of NOR circuit 103, its source connected to GND, and its drain connected to the carry output terminal CO. A transfer gate 107 has its gate connected to the output of NOR circuit 104, its source connected to a carry input terminal CI and its drain connected to carry output terminal CO. This is the configuration of a one digit comparator circuit 200.

The operation of the one digit comparator circuit 200 is described below.

If A>B then the first input data A is a "1" and the second input data B is a "0" and the following logic levels are generated: the output of the inverter 102 to which the second input data B is entered becomes "1", the output of the NAND circuit 100 becomes "0", the output of the inverter 101 becomes "1", the output of the NOR circuit 103 becomes "0", and the output of the NOR circuit 104 becomes "0". Accordingly, the carry output terminal CO outputs a "1" by turning transfer gates 106 and 107 "OFF" and by turning the transfer gate 105 "ON".

If A<B, then the first input data A is a "0" and the second input data B is a "1" and the following logic levels are generated: the output of the inverter 102 to which the second input data B is entered becomes "0", the output of the NAND circuit 100 becomes "1", the output of the inverter 101 becomes "0", the output of the NOR circuit 103 becomes "1", the output of the NOR circuit 104 becomes "0". Accordingly, the transfer gates 105 and 107 are turned "OFF", the transfer gate 106 is turned "ON" and the carry output terminal CO outputs a "0".

If A=B, then the first input data A and the second input data B are both "1" or both "0" and the following logic levels are generated: the output of the inverter 101 becomes "0", the output of the NAND circuit 100 becomes "1", the output of the inverter circuit 101 becomes "0", the output of the NOR circuit 103 becomes "0", and the output of the NOR circuit 104 becomes "1". The carry output terminal CO assumes the same value as the carry input terminal CI by turning the transfer gates 105 and 106 "OFF", and by turning the transfer gate 107 "ON".

FIG. 6 shows a multiple digit (here a four digit) comparator based on the one digit comparator circuit 200 shown in FIG. 5. FIG. 7 is a timing chart for the comparator circuit of FIG. 6.

The symbols used in FIG. 5 are used for the same or corresponding parts of FIG. 6 and FIG. 7. In FIG. 6, A and B are four bit input data. The bits of the first input data A, viewed from the least significant bit (LSB), are assigned the names A0, A1, A2, and A3. The bits of the second input data B, viewed from the LSB, are assigned the names B0, B1, B2, and B3. The comparator circuit 200 is identical to the comparator circuit shown in FIG. 5.

A clock input CL is entered at the LSB carry input terminal CI0. Each of the carry input terminals CI (N) for the other digits is connected to the carry output terminal CO (N−1) for the previous stage (N is an integer between 1 and 3). An N channel transistor 201 has its source connected to the most significant bit (MSB) carry output terminal CO3 and its gate connected to the clock input CL. An inverter 202 is an input to the drain of the N channel transistor 201. An inverter 203 takes the output of the inverter 202 as its input. An inverter 204 takes the clock input CL as its input. An N channel transistor 205 has its source connected to the output of the inverter 203; its gate connected to the output of the inverter 204; and its drain connected to the input of the inverter 202. The inverters 202, 203, and 204, together with the N channel transistors 201 and 205 constitute a latch 210.

A strobe clock SCK is connected to the inputs of NOR circuits 207, 208 and 209. If the outputs of the inverter 206 and of the inverter 202 are connected to a NOR circuit 207, then, as shown in FIG. 7, the strobe clock SCK is entered and the output of the NOR circuit 207 goes to "1" since A>B. If the output of the MSB carry output terminal CO3 and the output of the inverter 202 and the strobe clock SCK are inputted to a NOR circuit 208, then its output becomes "1" since A=B. If the output of the MSB carry output terminal CO3, the output of the inverter 203, and the strobe clock SCK are entered in the NOR circuit 209, then its output becomes "1" since A<B.

The operation of the four digit comparator circuit is described below.

If when (A0, A1, A2, A3)=(0,0,1,0), (B0, B1, B2, B3)=(0,0,1,0) then each of the transfer gates 107 are turned "ON", and CI0=CO0=CI1=CO1=CI2=CO2=CI3=CO3. this means that the MSB carry output terminal CO3 becomes "1" during the first half of the clock input CL and that when the clock input CL changes from "1" to "0", the latch 210 is latched at "1". The latch 210 holds "1", the output of the inverter 202 becomes "0", the output of inverter 203 becomes "1" and the output of the NOR circuit 209 goes to "0" to show that A<B. Moreover, if the clock input CL is "0", then 0=CI0=CO0=CI1=CO1=CI2=CO2=CI3=CO3, the output of inverter 206 becomes "1" and the output of the NOR circuit 207 becomes "0" to show that A>B. The NOR circuit 208, by setting the MSB carry output terminal CO3 to "0", sets the output of the inverter 202 to "0" and the timing of the strobe clock SCK to "1" to show that A=B.

FIG. 7 shows the timing of the output of the NOR circuit 207, which indicates that A>B, or of the output of the NOR circuit 209, which indicates that A<B, when the first data output A and the second output B have various values and when the timing of the strobe clock SCK is "0".

Conventional comparators are configured as described above. Each digit of multiple digit comparators can be configured based on the single digit model. This configuration, however, which requires a latch 210, three input NOR circuits 207-209, and an inverter 206 in the last stage of the comparator circuit in order to output a signal determined by the relative magnitude of the two input data A and B has the drawbacks of an uneven layout, increased circuit size and a longer delay time.

SUMMARY OF THE INVENTION

An object of this invention is to facilitate the arrangement of given digits in a regular array thus providing a more regular layout.

Another object of this invention is to provide a comparator circuit adapted to operate at high speed.

According to the invention, the first and the second input data are checked for match. If the two input data match, the carry input data from the previous digit is outputted as the carry output data for the next digit; if the two input data do not match, then a non-match signal is outputted as the carry output data for the next digit. Next, if the carry input data and the carry output data do not match then a change point signal is outputted. When this change point signal is outputted, the first and the second input data are outputted.

These and other objects of this invention will become more apparent in the detailed description and examples which follow.

BRIEF DESCRIPTION OF THE DRAWINGS

FIG. 2 is a truth table of the comparator circuit shown in FIG. 1;

FIG. 4 is a truth table of the comparator circuit shown in FIG. 3;

DESCRIPTION OF THE PREFERRED EMBODIMENT

A one bit comparator circuit according to an embodiment of this invention will be described. Then a multiple bit comparator circuit according to another embodiment of this invention will be described.

Figure 1:
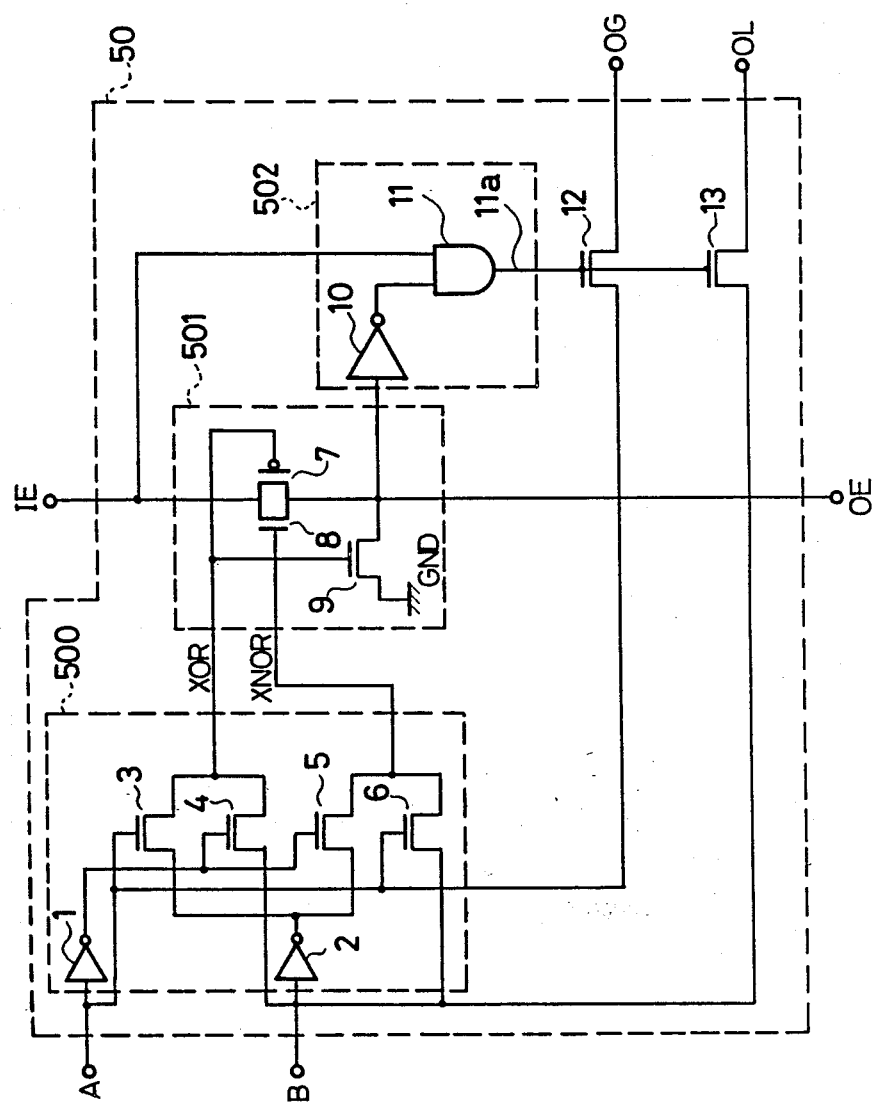
FIG. 1 is a circuit diagram of a one bit comparator circuit according to an embodiment of this invention.

FIG. 1 shows a one bit comparator circuit in which a first input data A is compared with a second input data B. An inverter 1 receives the first input data A and outputs an invertted signal. An inverter 2 receives the second input data B and outputs an inverted signal. An N channel transistor 3 has the input data A connected to its gate and the output of the inverter 2 connected to its source. An N channel transistor 4 has the output of the inverter 1 connected to its gate and the input data B connected to its source. XOR is an exclusive OR logical signal of the first input data A and the second input data B connected to the drains of the N channel transistors 3 and 4.

An N channel transistor 5 has the output of the inverter 1 connected to its gate, and the output of inverter 2 connected to its source. An N channel transistor 6 has the input data A connected to its gate and the second input data B coneted to its source. XNOR is an exclusive NOR logical signal of the first input data A and the second input data B connected to the drains of the N channel transistors 5 and 6.

An input data IE is carried from the previous digit. A P channel transistor 7 has the carry input data IE connected to its source and the exclusive OR logical signal XOR connected to its gate. An N channel transistor 8 has the carry input data IE connected to its source and the exclusive NOR logical signal XNOR connected to its gate. An N channel transistor 9 has GND connected to its source and the exclusive OR logical signal XOR connected to its gate. OE is next digit carry output data connected to the drains of the P channel transistor 7 and the N channel transistors 8 and 9.

An inverter 10 receives the carry output data OE and outputs an inverted signal. An AND circuit 11 receives the carry input data IE and the output of the inverter 10. If the carry input data IE and the carry output data OE are different, then the AND circuit 11 outputs a change point signal 11a. An N channel transistor 12 has the change point signal 11a outputted by the AND circuit 11 connected to its gate, the first input data A connected to its source and an output signal OG connected to its drain. An N channel transistor 13 has the change point signal 11a from the AND circuit 11 connected to its gate, the second input data B connected to its source and an output signal OL connected to its drain.

Accordingly, a match detection circuit 500 determines if the first input data A matches the second input data B. If the match detection circuit 500 detects a match between the first input data A and the second input data B, a transmission circuit 501 outputs the carry data IE from the previous digit unchanged to the next digit as the output data OE. If the two input data A and B do not match, then a no match signal is outputted as the output data OE. A change point detection circuit 502 outputs a change point signal 11a generated by the match or non match of the carry input data IE of the data transmission circuit 501 with the carry output data OE. According to this invention, the N channel transistor 12 is the first signal output unit; when the change point signal 11a is outputted, the first output data A is outputted as the output signal OG. The N channel transistor 13 is the second signal output unit; when the change point signal 11a is outputted, the second output data B is outputted as the output signal OL. The above describes the configuration of a one bit comparator circuit 50.

Next, the operation of this one bit comparator circuit 50 is explained in detail with reference to the truth table of FIG. 2.

If the first input A=1 and the second input B=0 when A>B, or if A=0 and B=1 when A<B, then in the match detection circutit 500, the exclusive OR logic signal XOR="1" and the exclusive NOR logic signal XNOR=0, and the exclusive NOR signal XNOR and the exclusive OR signal XOR are sent in the transmission circuit 501. If the exclusive OR signal on the transmission circuit 501 XOR=1, then since the exclusive NOR signal XNOR=0, the P channel transistor 7 is turned "OFF", the N channel transistor 8 is turned "OFF", the carry input data IE from the upper bit is not transmitted, and the N channel transistor 9 is turned "ON", the carry output data OE=0.

Since on the change point detection circuit 502 the carry output data OE=0, the output of the inverter 10 becomes "1", and the AND circuit 11 outputs a change point signal 11a="1" if a no match signal is not generated for all the bits up to the most significant bit resulting in carry input data IE=1. Accordingly, the N channel transistors 12 and 13 are turned "ON" and the value of the first input data A is outputted as ouput signal OG and the value of the second input data B is outputted as the output signal OL as shown in TABLE 1.

If the first input data A=the second input data B=0, or A=B=1, then the value of the exclusive OR signal XOR on the match circuit 500 is "0" and the exclusive NOR signal XNOR=1, then the exclusive NOR signal XNOR and the exclusive OR signal XOR are sent on the transmission circuit 501. If the exclusive OR signal XOR=0 and the exclusive NOR signal XNOR=1 on the transmission circuit 501, then the P channel transistor 7 is turned "ON", the N channel transistor 8 is turned "ON", the N channel transistor 9 is turned "OFF", and the carry input data IE from the upper bit is outputted as the carry output data OE. On the change point detection circuit 502, since the carry input data IE=the carry output data OE, entering the inversion of the carry output data OE by the inverter 10 and the carry input data IE in the AND circuit 11, the change point signal 11a becomes "0", the N channel transistors 12 and 13 are turned "OFF", and the output signals OG and OL go into a high impedance state Z.

Next, the embodiment of the multiple (here four bit) bit comparator circuit based on the one bit comparator circuit 50 of this invention is shown in FIG. 2.

Figure 3:
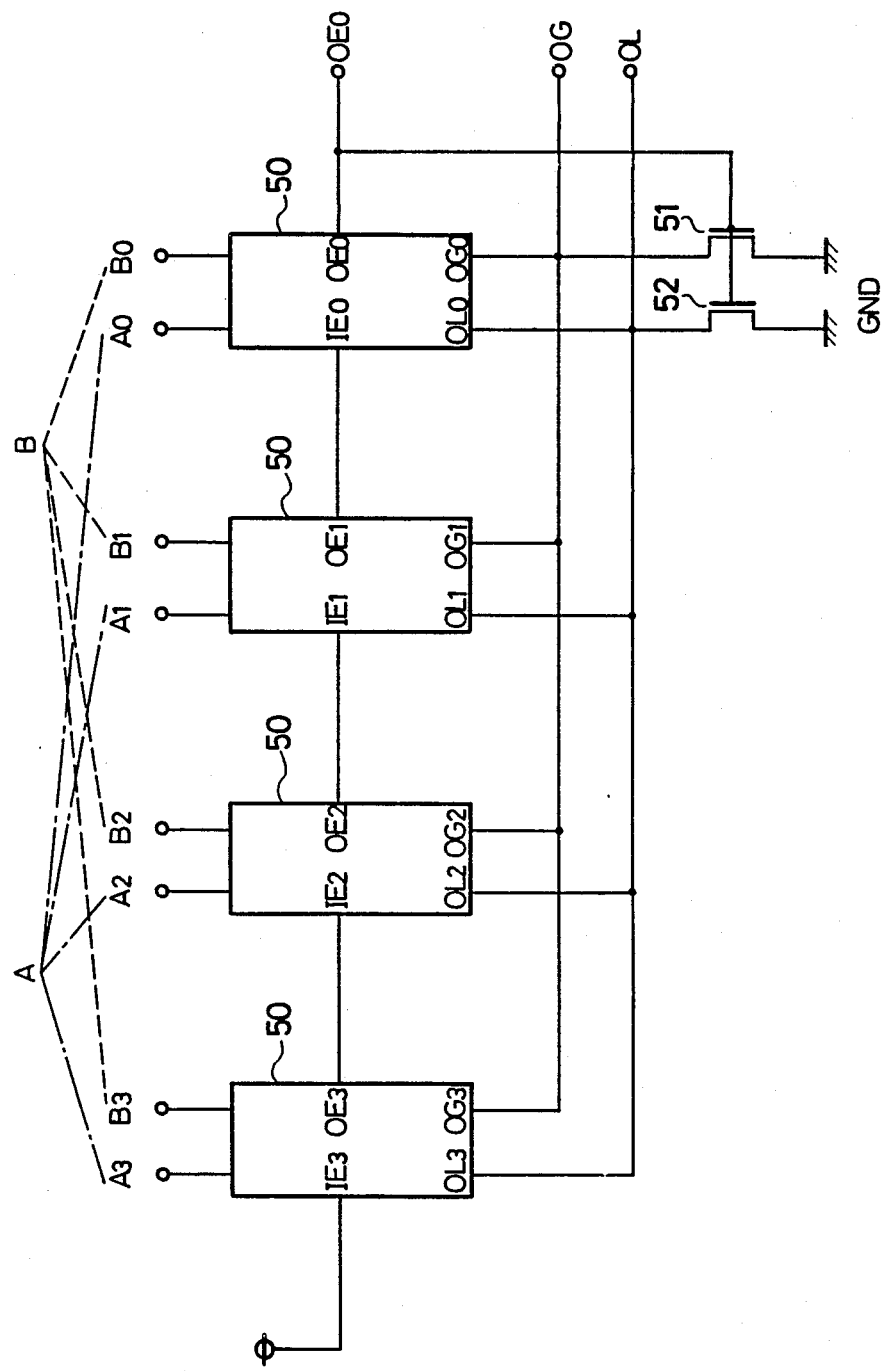
FIG. 3 is a circuit diagram of a multiple bit comparatos circuit according to another embodiment of this invention.
Figure 5:
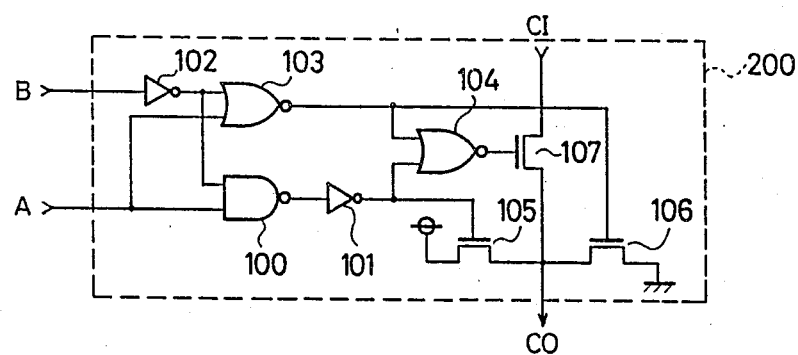
FIG. 5 is a circuit diagram of a conventional one bit comparator circuit.
Figure 6:
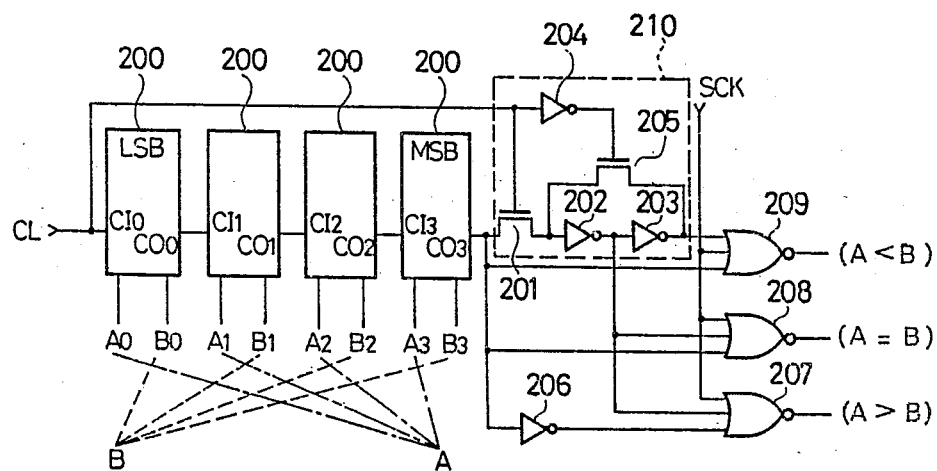
FIG. 6 is a circuit diagram of a conventional multiple bit comparator circuit.
Figure 7:
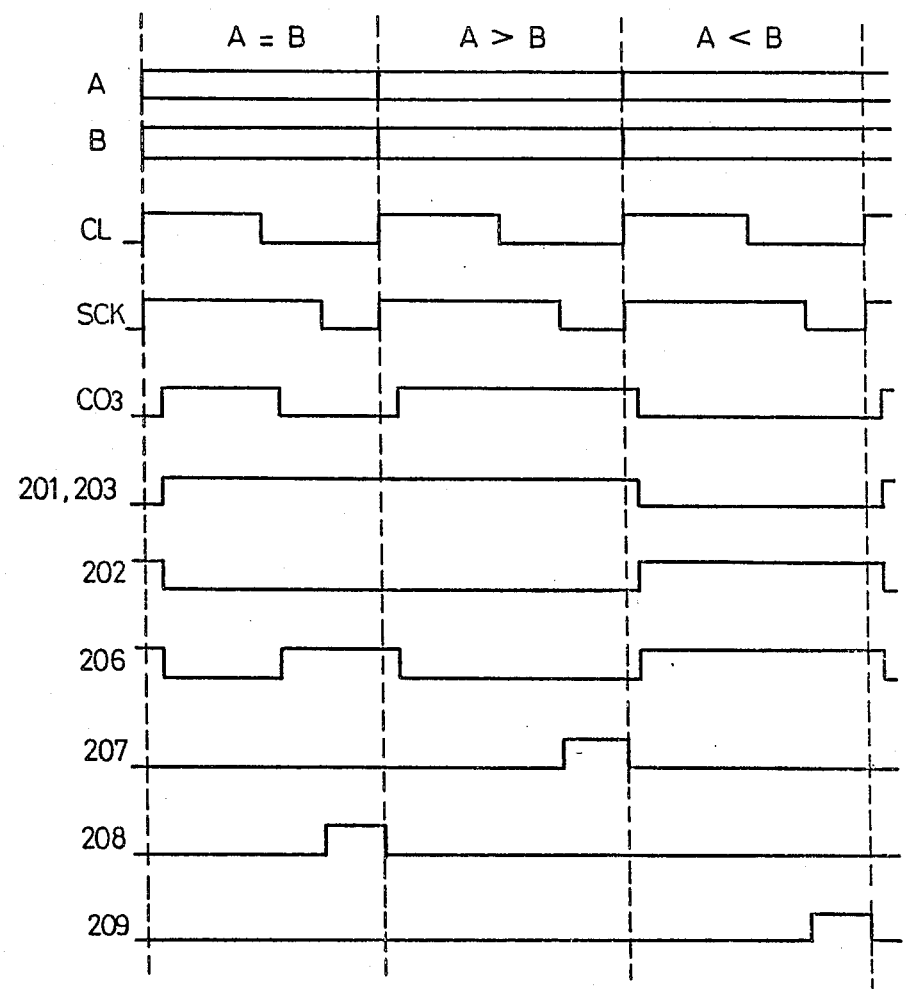
FIG. 7 is a timing chart of the multiple bit comparator circuit show in FIG. 6.

FIG. 3 uses the same symbols as FIG. 1 for the same or comparable parts. A and B are four bits input data viewed from the most significant bit (MSB) as (A3, A2, A1, A0) and (B3, B2, B1, B0).

A carry input data IE (k-1) of each bit of the one bit comparator circuit 50 is connected in series with an upper bit carry output data OE (k). An input signal IE3 of the most significant bit is connected to the power supply (k is an integer between 1 and 3). Output signals OGi and OLi of the output signal of each bit are connected in parallel (i is an integer between 0 and 3). An N channel transistor 51 has GND connected to its source, the carry output data OE0 of the least significant bit connected to its gate, and the output signal OG connected to its drain. An N channel transistor 52 has GND connected to its source, the carry output data OE0 of the least significant bit connected to its gate, and the output signal OL connected to its drain.

Accordingly, the carry output data OE0 of the least significant bit is "1" if A=B. If A>B, then the output signal OG is "1". If A<B, then the output signal OL is "1".

Next, the operation of the multiple bit comparator circuit is explained in detail with reference to the truth table shown in FIG. 4.

For example, if as shown in FIG. 4, when (A0, A1, A2, A3)=(0,1,0,0), B0, B1, B2, B3)=(0,1,0,0) then since each bit of the single bit comparator circuits 50 sends 1=IE3=OE2=IE1=OE1=IE0=OE0, the carry output data OE0=1 to show that A=B. Concurrently, since the least significant bit output data OE0=1, the N channel transistors 51 and 52 are turned "ON" to set the output signals OG and OL to "0" indicating neither A>B nor A>B.

Next, if as shown in TABLE 2 of FIG. 4, when (A0, A1, A2, A3)=(0,1,1,0), (B0, B1, B2, B3)=(0,0,1,0) then although up to the second bit from the MSB position 1=IE3=OE3=IE2=OE2=IE1, the output of the exclusive OR signal XOR on the one bit comparator circuit 50 for the third bit from the MSB position sets the carry output data OE1 to "0". Below the third bit from the MSB position, since the least significant bit becomes 0=OE1=IE0=OE0 and the carry output data OE0=0 to show that A≠B. If the third bit from the MSB position on the one bit comparator circuit 50, A1=OG1=OG=1, B1=OL1=OL=0, then the result shown is A>B but not A<B.

Thus, this invention compares two input data beginning with the MSB bit can immediately output a signal which indicates which of the input data is larger if the bits compared do not match. This makes it possible to provides a comparator which is faster than conventional comparators, which do not output the results of the comparison until all the bits of the two inputs have been compared. Moreover, any bits can be placed in a regular array.

What is claimed is:

1. A binary one-digit comparator circuit useful for a multiple digit comparator circuit, which comprises:
   a match detection circuit for determining whether or not first input data and second input data match;
   a transmission circuit for outputting carry input data from a previous digit to a next digit if said match detection circuit determines that said first input data and said second input data match or a no match signal to said next digit if no match between said first input data and said second input data is detected;
   a change point detection circuit for outputting a change point signal if said carry input data and carry output data on said transmission circuit do not match;
   a first signal output unit for outputting said first input data when said change point detection circuit outputs said change point signal; and
   a second signal output unit for outputting said second input data when said change point detection circuit outputs said change point signal.

2. The comparator circuit of claim 1, wherein said match detection circuit comprises:
   a first inverter for receiving a first input data A and outputting an inverted signal;
   a second inverter for receiving a second input data B and outputting an inverted signal;
   an N channel transistor having said first input data A connected to its gate and an output of said second inverter connected to its source;
   an N channel transistor having an output of said first inverter connected to its gate and said second input data B connected to its source;
   an N channel transistor having an output of said first inverter connected to its gate and an output of said second inverter connected to its source; and
   an N channel transistor having said first input data A connected to its gate and said second input data B connected to its source.

3. The comparator circuit of claim 1, wherein said transmission circuit comprises:
- a P channel transistor having a carry input data IE connected to its source and an exclusive OR signal XOR of a first input data A and a second input data B inputted to its gate;
- an N channel transistor having a carry input data IE connected to its source and an exclusive NOR signal XNOR of said first input data A and said second input data B inputted to its gate; and
- an N channel transistor having GND connected to its source and said exclusive OR signal XOR inputted to its gate.

4. The comparator circuit of claim 1, wherein said change point detection circuit comprises:
- an inverter for receiving a carry output data OE and outputting an inverted signal; and
- an AND circuit having a carry input data IE and an output of said inverter as its inputs.

5. The comparator circuit of claim 1, wherein said first and second output units comprise respectively:
- an N channel transistor having a change point signal from said change point detection circuit inputted to its gate, a first input data A connected to its source, and an output signal OG connected to its drain; and
- an N channel transistor having a change point signal from said change point detection circuit inputted to its gate, a second input data B connected to its source, and an output signal OL connected to its drain.

* * * * *